United States Patent [19]
Murphy

[11] Patent Number: 6,155,402
[45] Date of Patent: Dec. 5, 2000

[54] CONVEYOR SYSTEM

[75] Inventor: Patrick M. Murphy, Clarkston, Mich.

[73] Assignee: Valiant Machine & Tool Inc., Windsor, Canada

[21] Appl. No.: 09/079,340

[22] Filed: May 14, 1998

[51] Int. Cl.[7] .................................................. B65G 37/00
[52] U.S. Cl. ..................................... 198/346.2; 198/465.1
[58] Field of Search .............................. 198/343.2, 345.3, 198/346.1, 346.2, 346.3, 465.4, 782, 465.1, 465.3

[56] References Cited

U.S. PATENT DOCUMENTS

| | | | |
|---|---|---|---|
| 4,336,438 | 6/1982 | Vehara et al. | 198/346.2 X |
| 4,392,770 | 7/1983 | Castille | 198/782 X |
| 4,600,095 | 7/1986 | Brems et al. | 198/346.2 |
| 4,901,412 | 2/1990 | Jones | 198/465.1 X |
| 5,013,203 | 5/1991 | Wakabayashi | 198/465.3 |
| 5,062,188 | 11/1991 | Jones et al. | 198/465.1 X |

Primary Examiner—James R. Bidwell
Attorney, Agent, or Firm—Gifford, Krass, Groh, Sprinkle, Anderson & Citkowski, P.C.

[57] ABSTRACT

A conveyor system having an infeed conveyor section, an outfeed conveyor section, and a working conveyor section positioned in between and in line with the infeed and outfeed conveyor sections. The working conveyor section includes a base and a frame which is movably mounted relative to the base between a lower position and a raised position. In order to move the frame between its lower and raised position, a driver is rotatably mounted about a substantially horizontal axis to the base while an elongated drive link has one end pivotally connected to the frame and its other end pivotally connected to the driver at a position radially spaced from its axis. A drive mechanism selectively pivots the driver between first and second rotational positions which are spaced substantially 180 degrees from each other. In doing so, the coaction between the driver and the drive link moves the frame between its raised and lowered position.

5 Claims, 4 Drawing Sheets

CONVEYOR SYSTEM

BACKGROUND OF THE INVENTION

I. Field of the Invention

The present invention relates to conveyor systems.

II. Description of the Prior Art

There are many previously known conveyor systems. In one type of conveyor system, rollers engage work pieces supported on the conveyor system in order to propel the work pieces from one end of the conveyor system and toward the other end. In many cases, one or more work stations are positioned along the conveyor line in order to perform work of one sort or another upon the work pieces.

These previously known roller conveyor systems typically propel the work pieces along a generally horizontal plane. In some instances, such as the assembly of an automotive body, it is desirable or even necessary to elevate the work piece above the plane of the conveyor line at a particular work station and before the work is performed on the work piece.

In order to accomplish the elevation of the work piece at a particular work station, it has been the previously known practice to provide a lifter assembly beneath the conveyor line at the work station. Thus, once the work piece is conveyed to the work station, activation of the lifter assembly elevates the work piece from a lower and to a raised position. These previously known lifter assemblies typically engage preset location points on the work piece.

While these previously known lifter assemblies have proven adequate where the work pieces are identical to each other, and thus have identical location points for the lifter assembly, in some cases, different types of work pieces having different location points for the lifter assembly are conveyed on a common conveyor line.

One such example of this latter case is in the assembly of the body for automotive vehicles. In such conveyor lines, the automotive bodies are initially supported on a skid which is conveyed down the conveyor line. However, since different automotive bodies may be conveyed by a common conveyor line, it is oftentimes necessary to provide different lifter assemblies at a single work station in order to accommodate these different automotive bodies.

SUMMARY OF THE PRESENT INVENTION

The present invention provides a conveyor system which overcomes all of the above-mentioned disadvantages of the previously known conveyor systems.

In brief, the conveyor system of the present invention comprises an infeed conveyor section, and outfeed conveyor section and a working conveyor section disposed in between the infeed and outfeed sections.

The working conveyor section includes a base, a frame and means for movably securing the frame to the base between a lower position and a raised position. In the preferred embodiment of the invention, this lifting means comprises a driver rotatably mounted about a substantially horizontal axis to the base and an elongated drive link having one end pivotally connected to the frame and its other end pivotally connected to the driver at a position radially spaced from its axis. Means then selectively pivot the driver between a first and second position which are angularly spaced apart from each other by substantially 180 degrees and, in doing so, moves the frame between its raised and lower position.

A primary advantage of applicant's invention is that, since the entire working conveyor section, together with any work pieces supported by it, are moved between a raised and lower position, different types of work pieces can be effectively conveyed by the conveyor system of the present invention. The present invention, however, has proven particularly effective for conveying automotive bodies on skids.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
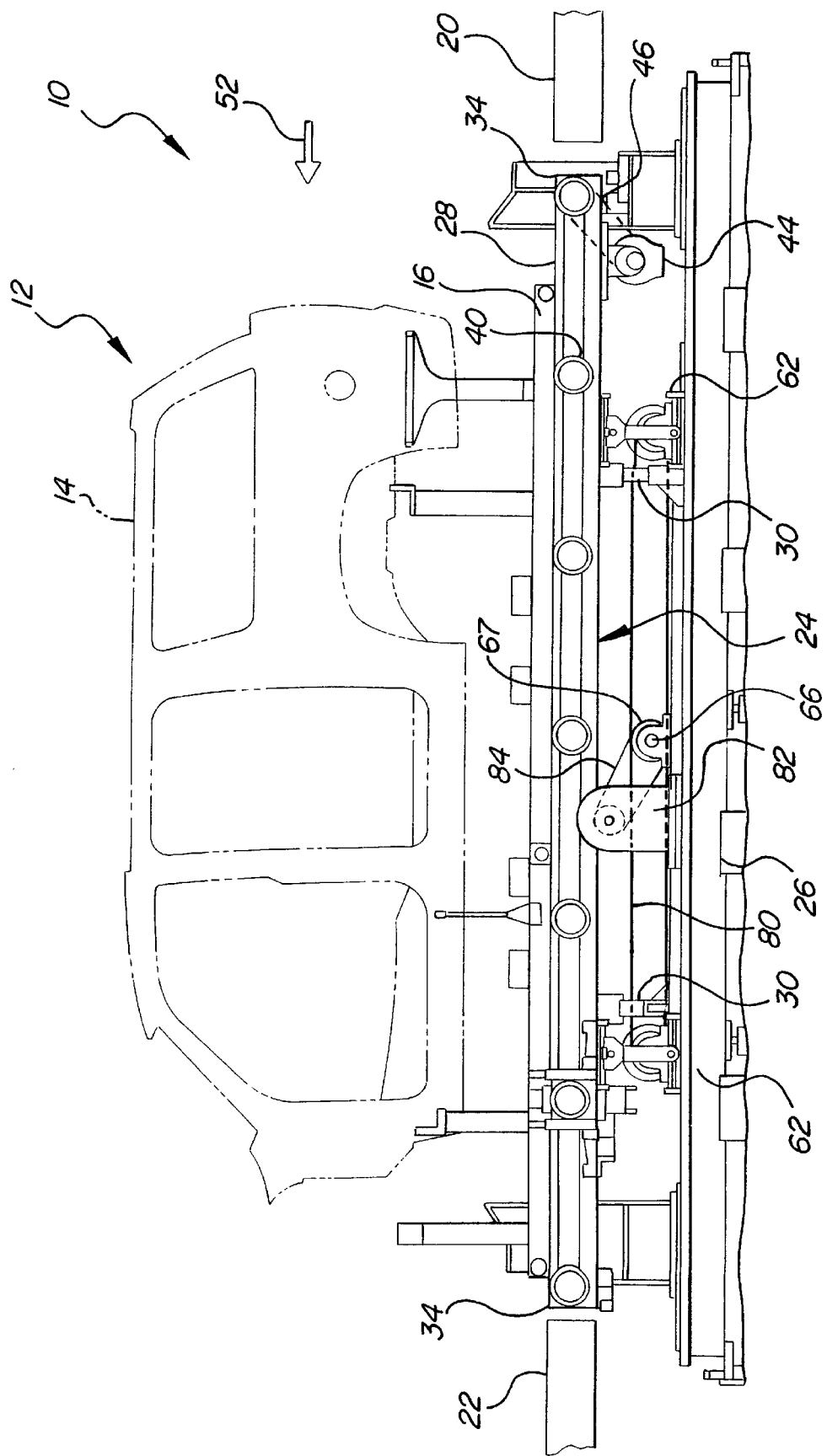
FIG. 1 is a side view illustrating a preferred embodiment of the present invention.
Figure 2:
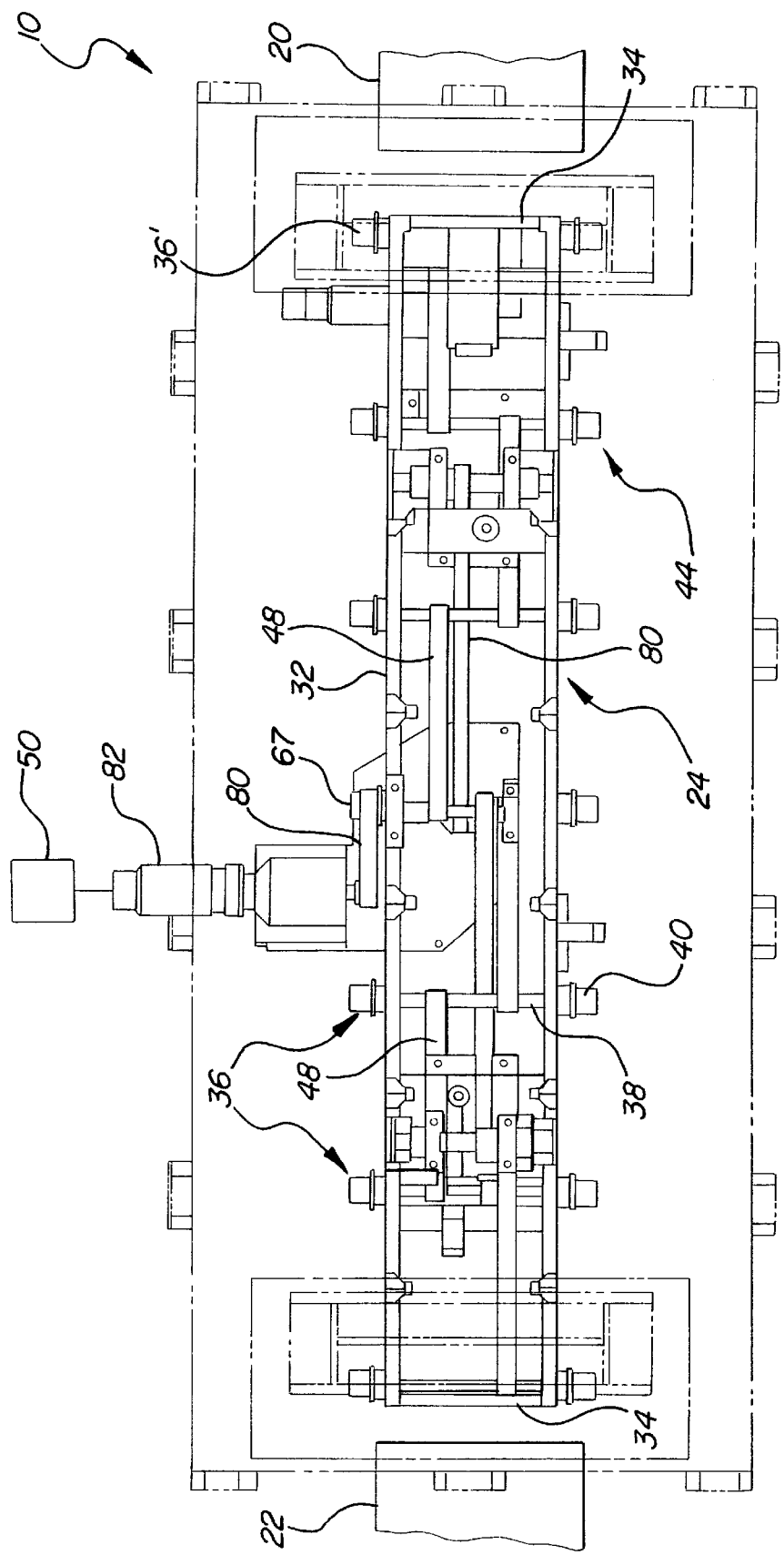
FIG. 2 is a top view illustrating the preferred embodiment of the present invention.
Figure 3:
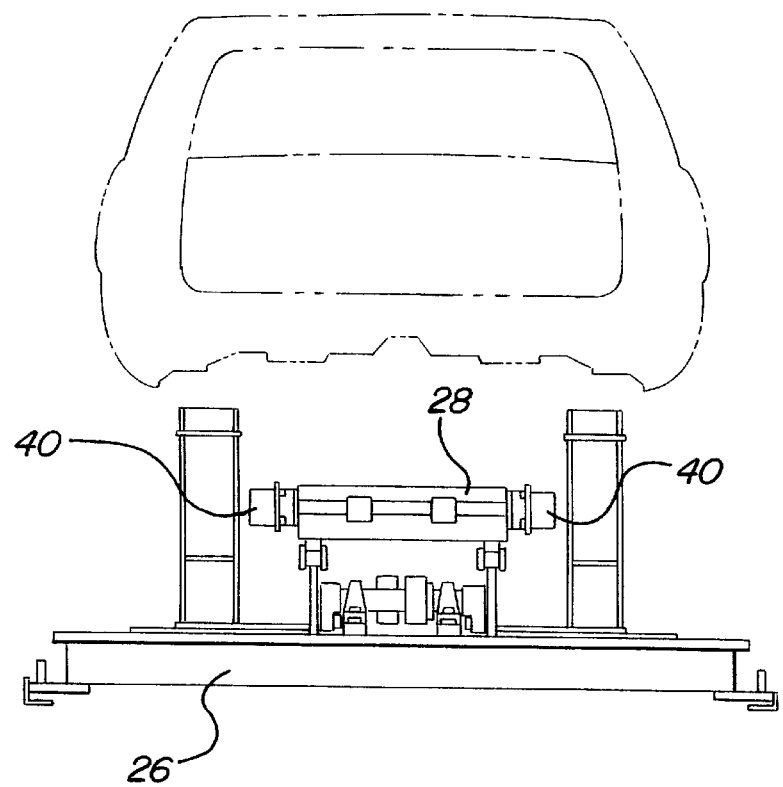
FIG. 3 is a front view illustrating the preferred embodiment of the present invention.

With reference first to FIGS. 1 and 2, a preferred embodiment of the conveyor system 10 of the present invention is there shown for transporting work pieces 12, such as an automotive body 14 supported on a skid 16. The conveyor system 10 includes an infeed conveyor section 20, an outfeed conveyor section 22 and a working conveyor section 24 positioned in between the infeed and outfeed conveyor sections 20 and 22, respectively.

In a fashion which will be subsequently described in greater detail, the working conveyor section 24 is movable between a raised and a lower position. The working conveyor section 24 is illustrated in its lower position in FIG. 1 and, as such, the working conveyor section 24 lies on generally the same horizontal plane as both the infeed and outfeed conveyor sections 20 and 22, respectively. As such, the working conveyor 24 receives the work piece 12 from the infeed conveyor 20 and, upon completion of a work operation, conveys the work piece 12 to the outfeed conveyor 22.

Still referring to FIGS. 1 and 2, the working conveyor section 24 includes a base 26 which is mounted to a ground support surface and a frame 28 which is vertically movably mounted relative to the base 26 by vertical bearings 30 (FIG. 1). The vertical bearings 30 are conventional in construction and permit vertical movement of the frame 28 relative to its base 26 but prevent either lateral or longitudinal movement of the frame 28 relative to its base 26.

Any conventional means can be employed to convey the work piece 12 along the working conveyor section 24. However, in the preferred embodiment of the invention, the frame 28 includes a pair of elongated and spaced apart rails 32 which are secured together by end cross supports 34. A plurality of longitudinally spaced apart roller assemblies 36 are rotatably mounted by individual axles 38 to the rails 32 such that each roller assembly 36 includes one roller 40 extending laterally outwardly from each rail 32. These rollers 40 engage and support the bottom of the skid 16 (FIG. 1).

A motor 44 (FIG. 2) is drivingly connected to one of the roller assemblies 36' via a drive belt 46. Additional drive belts 48 then extend between the roller assembly 36' and the other roller assemblies 36 such that, upon activation of the motor 44 by a control system 50, the rollers 40 are rotatably driven in synchronism with each other. In doing so, the rollers 40 propel the work piece 12 (FIG. 1) supported by the rollers 40 in the direction of arrow 52 (FIG. 1).

In the preferred embodiment, the rollers 40 include a polyurethane outer coating which contacts and supports the work piece 12 and/or skid 16. The polyurethane coating on the rollers enhances the frictional engagement between the work piece 12 and the rollers 40 to permit rapid acceleration and deceleration of the work piece 12 by the motor 44. It will be understood, of course, that during the actual operation of the working conveyor section 24, the work pieces 12 are typically moved from the infeed conveyor section 20 to the working conveyor section 24 and then stopped during a work operation. Following completion of the work operation, the motor 44 is again actuated thus propelling the work piece 12 onto the outfeed conveyor section 22.

Figure 4:
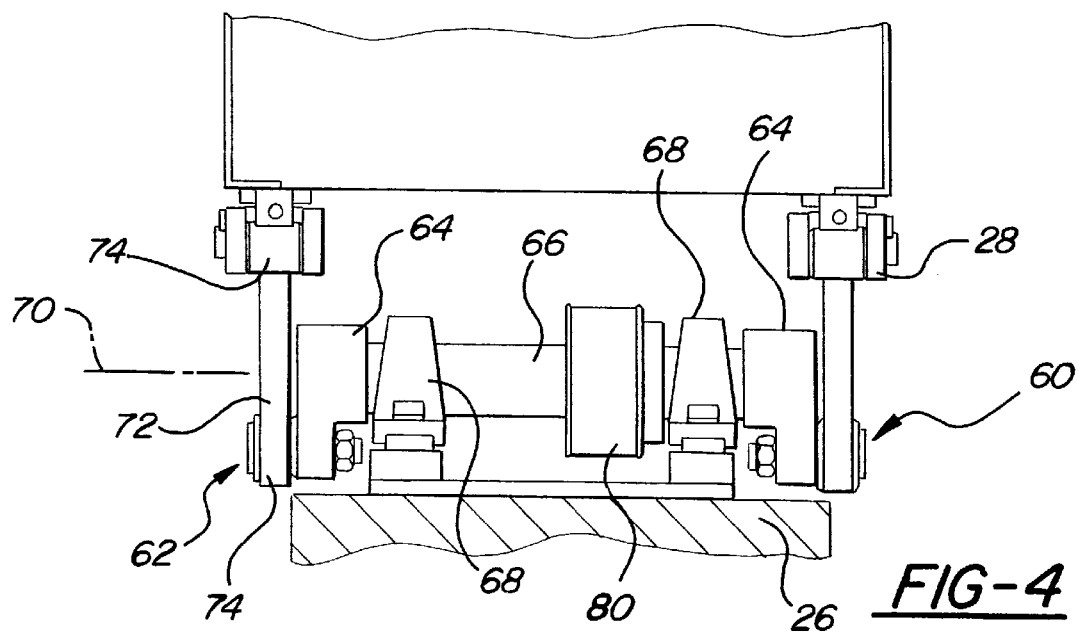
FIG. 4 is a front view illustrating the lifting mechanism of the preferred embodiment of the present invention in a lowered position.
Figure 5:
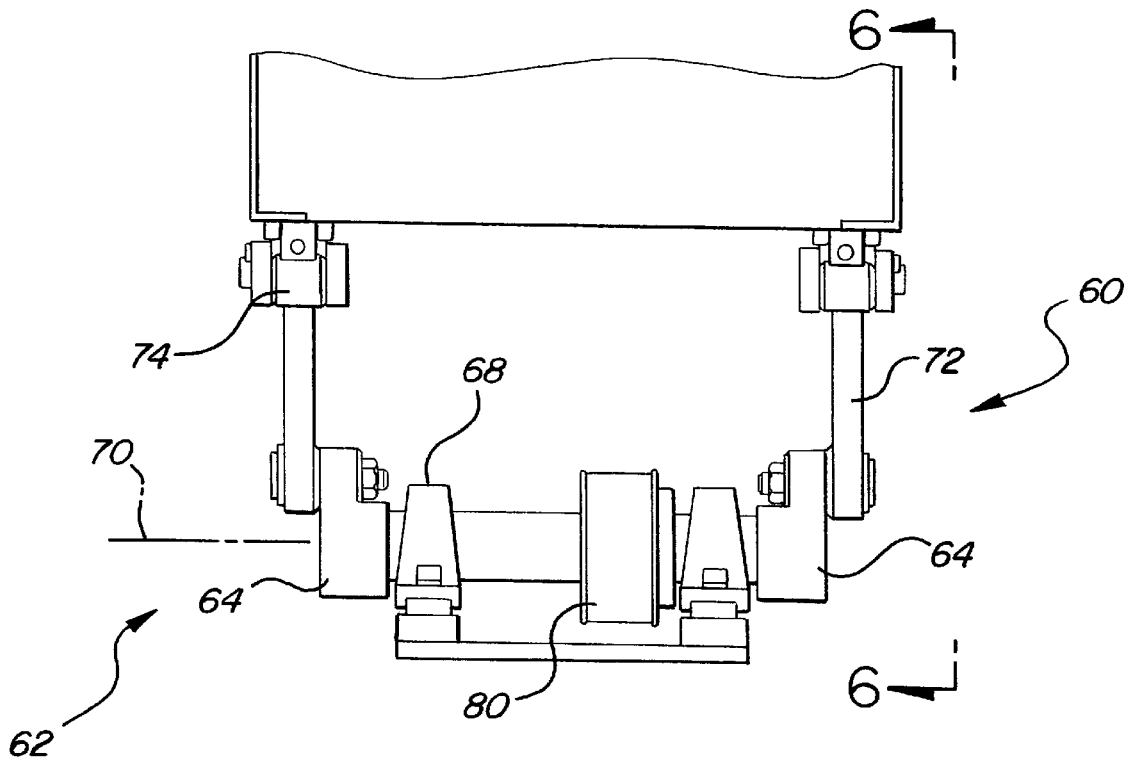
FIG. 5 is a view similar to FIG. 4, but illustrating the lifting mechanism in a raised position.
Figure 6:
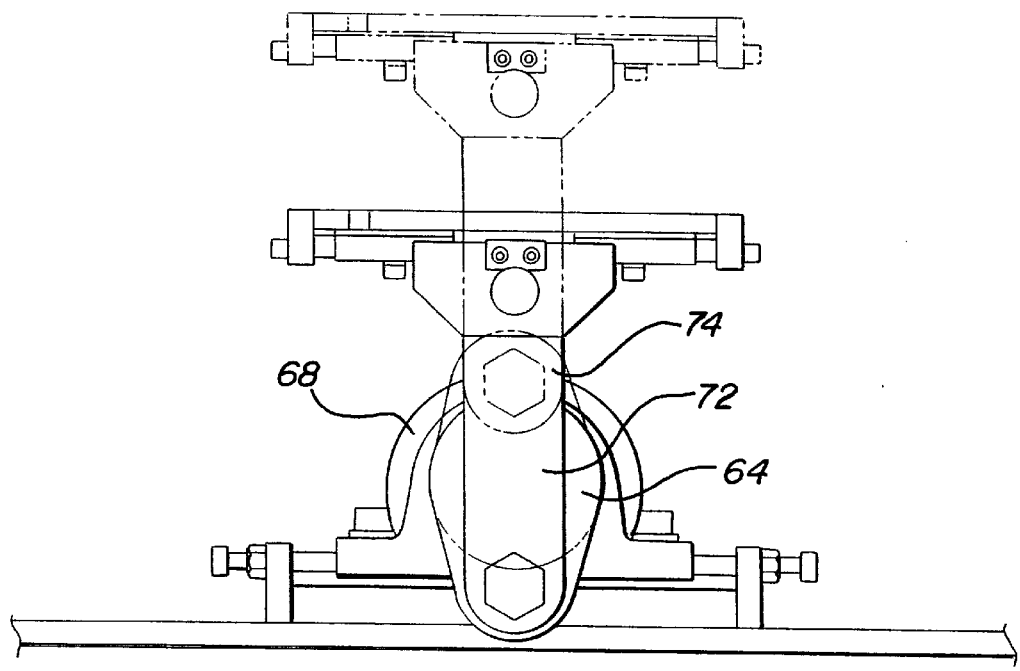
FIG. 6 is a view taken substantially along line 6—6 in FIG. 5.

With reference now to FIGS. 4–6, a lifting assembly 60 is there shown for lifting the frame between a lower position, illustrated in FIG. 4 and in solid line in FIG. 6 and a raised position, illustrated in FIG. 5 and in phantom line in FIG. 6. The lifting assembly 60 includes a pair of drive assemblies 62 such that one drive assembly 62 is positioned adjacent each end of the working conveyor section 24.

Each drive assembly 62 comprises a pair of drivers 64 which are secured to opposite ends of a shaft 66. The shaft 66, in turn, is rotatably mounted by spaced bearing assemblies 68 to the base 26 so that the shaft 66, and thus the drivers 64, are rotatable about a generally horizontal axis 70.

Still referring to FIGS. 4–6, an elongated drive link 72 is associated with each driver 64. The drive link 72 has one end 74 pivotally connected to its associated driver 64 at a position parallel to but radially spaced from the driver rotational axis 70. The other end 74 of the drive link 72 is pivotally connected to the frame 28.

With reference now to FIGS. 1 and 5, any conventional means can be utilized for selectively pivoting the shaft 66, and thus the drivers 64, between a first and second position which are angularly spaced from each other by substantially 180 degrees. However, as shown in the preferred embodiment, a controllable motor 82 is driveably connected by a belt 80 and pulled 67 to drive the shaft 66.

Actuation of the motor 82 to drive the drivers 64 between their first position, illustrated in FIG. 4 and in solid line in FIG. 6, and their second position, illustrated in FIG. 5 and in phantom line in FIG. 6, simultaneously moves the frame 28 from its lower and to its upper position. Following conclusion of the work operation, the motor 82 is again actuated to return the drivers 64 to their first position again lowering the frame 28 to its lower position to enable the working conveyor section 24 to transfer the work piece 12 to the outfeed conveyor section 22.

Even though the working conveyor section 24 is preferably used to selectively raise the work piece during a work operation and then lower the work piece to be coplanar with the outfeed conveyor section, it will be understood, of course, that the working conveyor section 24 can alternatively be used to raise the work piece 12 from a lower plane of the infeed conveyor section 20 to a higher plane for the outfeed conveyor section 22.

Having described my invention, however, many modifications thereto will become apparent to those skilled in the art to which it pertains without deviation from the spirit of the invention as defined by the scope of the appended claims.

I claim:

1. A conveyor system comprising:

an infeed conveyor section, an outfeed conveyor section and a working conveyor section, said working conveyor section being positioned in between and in line with said infeed and outfeed conveyor sections, said working conveyor section comprising a base, a frame and means for movably securing said frame to said base between a lower position and a raised position, means on said working conveyor section for moving a work piece from said infeed conveyor section toward said outfeed conveyor section, at least one vertical bearing operatively disposed between said base and said frame, said vertical bearing permitting movement of said frame relative to said base between said lower and said raised positions while precluding horizontal movement of said frame relative to said base, wherein said means for moving said frame between said lower and raised positions comprises a pair of drivers rotatably mounted about a substantially horizontal axis to said base, and so that the axes of said drivers are spaced apart and parallel to each other, a pair of elongated drive links, each drive link being associated with one driver and having one end pivotally connected to said frame and its other end pivotally connected to its associated driver at a position radially spaced from said driver axis, means for selectively synchronously pivoting said drivers between a first and second position, said first and second positions being angularly spaced substantially 180 degrees apart from each other, said pivoting means comprising a drive belt operatively connected with each driver and a controllable motor which longitudinally displaces said belt.

2. The invention as defined in claim 1 wherein said work piece moving means comprises a plurality of rollers rotatably mounted to said frame and means for rotatably driving said rollers.

3. The invention as defined in claim 2 wherein said roller rotatable driving means comprises a variable speed motor.

4. The invention as defined in claim 2 wherein each roller includes an outer layer made of polyurethane.

5. The invention as defined in claim 2 wherein said work piece includes a skid having two spaced rails, said skid rails being supported by said rollers.

\* \* \* \* \*